Dec. 22, 1959     T. C. R. SHEPHERD     2,918,222
COMMINUTING APPARATUS
Filed Oct. 3, 1956
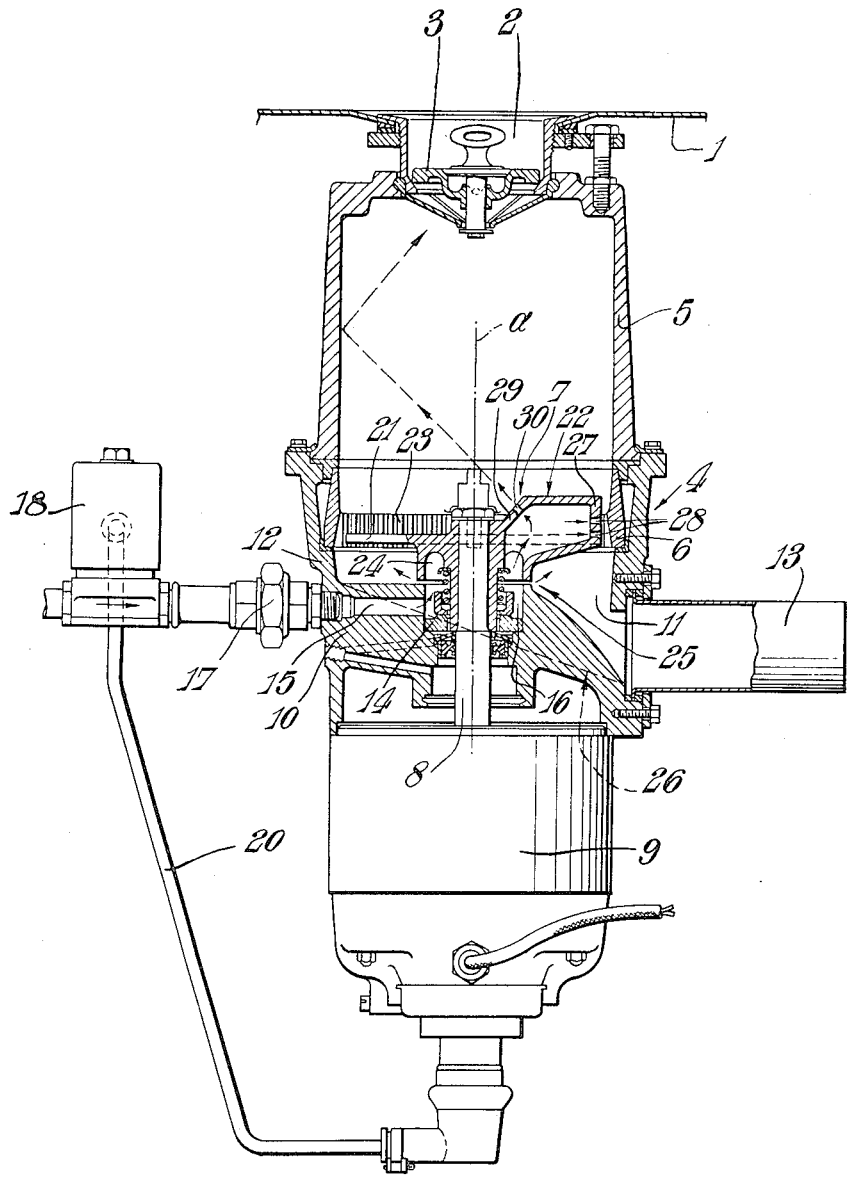
INVENTOR.
Thomas Cropper Ryley Shepherd
BY
Harness, Dickey & Pierce.
ATTORNEYS.

United States Patent Office 2,918,222
Patented Dec. 22, 1959

2,918,222

COMMINUTING APPARATUS

Thomas Cropper Ryley Shepherd, Ross-on-Wye, England

Application October 3, 1956, Serial No. 613,758

Claims priority, application Great Britain
October 7, 1955

3 Claims. (Cl. 241—46)

This invention concerns comminuting apparatus and relates more particularly to apparatus for comminuting tampons, swabs, wadding and other fibrous material although the invention is not so restricted and has application to comminuting non-fibrous material such as kitchen waste. In the latter regard the invention has particular application to comminuting tea leaves and other similar material.

The main object of this invention is the provision of an apparatus which will more effectively comminute material than with known constructions of apparatus.

An object of the invention is to reduce clogging of the apparatus.

Yet another object of the invention is to ensure that the teeth of a ring of teeth against which the material is comminuted shall not become clogged.

It is also an object of the invention to provide that the teeth are cleaned by water under pressure.

A further object is the provision of a comminuting apparatus wherein the material to be treated may be effectively washed away from the apparatus so that the latter is left in a clean and wholesome condition.

Yet another object of the invention is to clean the teeth and also to flush out the apparatus by a common source of water under pressure.

Another object is to ensure that the pressure of the water is created locally within the apparatus where it is required to act.

The invention, which is concerned with an apparatus comprising a rotor rotatable within a ring of teeth, material being comminuted between the ring of teeth and the rotor, is characterised in that there is means to direct a stream of water radially outwardly from the rotor against the ring of teeth.

According to a feature of the present invention a comminuting apparatus comprising a comminuting rotor rotatable within the ring of teeth is characterised in that there is means to supply water to the rotor and for discharging the water therefrom under centrifugal pressure in an outward radial direction against the ring of teeth.

The water applied to the ring of teeth will wash comminuted material away from between the teeth and, furthermore, may be effective in applying the material to be comminuted against the teeth for comminution thereby.

It is preferred that the rotor be provided, or formed with interior passageways terminating in discharge nozzles directed towards the teeth. Customarily the rotor is provided with breakers to co-act with the ring of teeth in which event the breakers are hollow and radially disposed and said nozzles are in walls at the outer radial extremities of the breakers. It may be arranged that the inner radial extremities of the breakers communicate with an axial passage in the rotor hub, said passage facing an axial passage in a stationary housing which is supplied with water under pressure.

A practical application of the present invention will now be described, by way of example only, with reference to the accompanying drawing which illustrates in elevation, and mainly in section, an apparatus in accordance with this invention.

Referring to the drawing: the apparatus is illustrated as fitted to the outlet of a kitchen sink, the bottom of which is indicated by the reference numeral 1, the bottom being provided, in conventional manner, with an outlet 2 which may be closed by a plug 3. When the plug is removed or opened material in the sink passes through the opening 2 and into the comminuting apparatus, which is generally indicated by the reference numeral 4.

The apparatus 4 comprises a casing 5 into which the waste material from the sink 1 drops from above. Immediately beneath the receiving chamber 5 is a toothed ring 6 and a rotor 7 mounted on a shaft 8 which is driven by an electric motor 9.

The shaft 8 is supported in a member 10 which defines the bottom of a discharge chamber 11 lying immediately beneath the rotor 7. The chamber 11 has cylindrical walls 12 and a discharge outlet 13.

The bottom member 10 constitutes a housing for a seal 14 which surrounds the shaft 8 and is provided to reduce ingress of material delivered to the apparatus (including water delivered with the material to be comminuted) to the electric motor 9. It has been found that in previous comminuting apparatus material delivered to the apparatus coming into contact with the shaft seal had an excessive abrading action on the seal with the result that its effective life was short. More particularly this is found when comminuting vegetable pairings which are commonly coated with earth particles, sand and the like. In order to reduce excessive wear of the seal 14 a radial channel 15 is provided in the member 10, the channel leading into a space 16 surrounding the seal 14. A water supply pipe 17 is connected to the member 10 so that water may pass along the channel 15 into the space 16 and the flow of water is controlled by a valve 18, the operation of which is determined by the electric motor 9, the latter being coupled to the valve 18, as at 20. It is arranged that when the motor 9 is started the valve 18 is opened and therefore water is delivered to the space 16. The supply of water will be at an adequate pressure to ensure a good flow of water through the space 16 as later described.

The rotor 7 comprises a disc portion 21 which carries a plurality of hollow breakers, generally indicated at 22. The breakers 22 co-act with the teeth 23 of the ring 6 to comminute material dropped into the casing 5, the comminuted material passing between the teeth and between the peripheral edge of the rotor and the teeth into the dischrage chamber 11 and being carried away from said chamber through the outlet 13 as more fully described hereinafter.

An axial passageway 24 is formed in the hub of the rotor 7, the passageway 24 being directly opposite to the space 16 which extends through the top of the member 10. The passageway 24 communicates with the interior of the hollow breakers 22 at the inner radial extremities of the breakers.

The rotor 7 is mounted on the shaft 8 so that the lower edge of the rotor is spaced by a small amount from the topmost part of the member 10, a narrow annular gap 25 being defined between the rotor and the member 10.

With the arrangement described water supplied to the space 16 passes axially upwardly into the passage 24 and from thence into the hollow breakers 22 for purposes which will later be referred to. Some of the water passing from the space 16 to the axial passageway 24 discharges through the narrow gap 25 and some of the water subjected to centrifugal pressure within the axial passageway 24 is forced under considerable pressure through said gap.

It will be appreciated that when the comminuting apparatus is brought into use and the motor 9 is started water will be supplied to the space 16 and after flowing around the seal 14 passes, in part, through the narrow gap 25. Since material destructive to the seal 14 can only enter the seal housing through said gap and at all times while the apparatus is in operation a stream of water is being ejected through said gap the stream of ejected water effectively prevents the admission of said material to the seal housing.

The water ejected through the gap 25 is directed over the undersurface of the rotor 7 and against the wall 12 of the chamber 11. Moreover, the water will flow over the upper surface of the member 10. The gap 25 is at the topmost part of the bottom member 10 and said surface slopes downwardly, as at 26, uniformly from the top of the member 10 towards the outlet 13, so that the latter is at the lowest part of the member 10. The water is ejected from the gap 25 near the top of the chamber 11 i.e. against the undersurface of the rotor 7 and towards the top of the wall 12 which is beneath the rotor and above the topmost part of the discharge outlet 13 with the effect that all of the water flows downwardly towards the outlet. The entire surface of the chamber 11 is flushed out by the water ejected from the gap 25 and comminuted material within the chamber 11 is carried by the stream of water to the outlet 13 and discharged therethrough so that after each operation of the comminuting apparatus the chamber 11 will be left in a clean and wholesome condition. This is particularly important since if particles of food and other material remain lodged in the apparatus unpleasant odours will occur and the general cleanliness will be seriously impaired.

Concerning the water which is supplied to the hollow breakers 22: the wall 27 at the outer radial extremity of each breaker is provided with a pair of vertically spaced nozzles 28, the nozzles being directed toward the teeth 23 of the ring 6. The upper of the pair of nozzles 28 is close to the top of the ring of teeth. Water under centrifugal pressure is discharged from the nozzles 28 in an outward radial direction to impinge on the teeth 23. The teeth are of increasing depth in the downward direction. The water impinging on the teeth will wash comminuted material from between the teeth and this material will be carried downwardly into the chamber 11, the increasing depth of the teeth assisting in this operation since once the material has become dislodged it will readily travel downwardly. The upper jet of water will impinge on the top part of the ring of teeth and part of the impinging stream will be directed upwardly to above the ring 6. Accordingly material lying upon the top of the ring of teeth is dislodged and is further acted upon by the breakers.

With the arrangement described the jets of water discharging from the nozzles 28 under centrifugal pressure prevent clogging of material between the teeth and the rotor and wash comminuted material away from between the teeth and carry it into the chamber 11 where it will be dealt with in the manner described above. It is thereby ensured that the teeth are maintained in a clean and wholesome condition at the end of each comminuting operation. Furthermore, the jets of water will apply material to the teeth and assist in the comminuting operation.

It will be observed that each hollow breaker 22 is formed, at its inner radial extremity, with a wall 29 which is obliquely inclined with respect to the axis of rotation of the shaft 8, the axis of rotation being indicated at $a$. Extending substantially normally through the wall 29 is a nozzle 30 so that water under pressure will be directed upwardly of the rotor towards the axis $a$. It is to be understood that at least a pair of diametrically opposed breakers 22 are provided on the rotors 7 and each rotor is formed with an inclined wall 29 as described and each wall is provided with a nozzle 30. As a result at least two upwardly directed jets of water are produced and it is arranged that these jets converge at, or near to, the axis $a$.

Certain loose materials when wet form a coherent mass which if it rests on the rotor 7 cannot be pulverised. One the other hand if the mass is carried outwardly it will clog the teeth 23 and, becoming lodged between the breakers 22 and the ring of teeth 6, will seriously impare the rotation of the rotor. Used tea leaves which in catering establishments, for instance, are commonly discharged into a comminuting apparatus in relatively large quantities is an example of such a material. Unless steps are taken to prevent these occurrences the apparatus may be brought to a standstill and the motor 9 burnt out. The upwardly directed jets of water leaving the nozzles 30 ensure that when such a mass is dropped through the opening 2 it is held in partial and temporary suspension and gradually passes between the breakers 22 and the ring of teeth 6 where it is acted upon and pulverised.

The jets of water from the nozzles 30 are directed towards the opposite side of the wall of the casing 5 and will ricochet therefrom in an upward direction to wash the wall and top of casing 5 and ensure that all material is carried downwardly past the rotor.

To sum up: firstly, the jets of water from the nozzle 30 maintain material such as tea leaves which tend to clog the rotor 7 in partial suspension and ensure that the mass is gradually fed to between the breakers 22 and the teeth 23 and they also act to wash down the casing 5 so that it is left in a clean and wholesome condition. Secondly, the jets from the nozzles 28 act to clean and clear the teeth 23 and to carry material downwardly into the chamber 11 as well as ensuring that clogging of material on the top of the ring 6 is prevented. Finally, the water ejected from the gap 25 washes the chamber 11 and carries comminuted material towards the outlet 13 from which it is discharged.

I claim:

1. A comminuting apparatus comprising a casing, a ring of teeth carried within the casing, a rotor rotatably mounted within the ring of teeth to co-act therewith for comminuting material introduced to the casing, means for driving the rotor, a duct passing through the casing for supplying water separately of the garbage, a water passageway extending radially of the rotor from near the center thereof to near the peripheral edge thereof, said rotor having discharge nozzles disposed adjacent and directed towards the ring of teeth, the nozzles connecting with the interior passageway, the water-supply duct delivering water to the interior passageways for discharge under centrifugal force through said nozzles against the ring of teeth.

2. A comminuting apparatus comprising a casing, a ring of teeth carried within the casing, a rotor rotatably mounted within the ring of teeth, hollow, radially-extending breakers to co-act with the ring of teeth for comminuting material introduced to the casing, discharge nozzles in the outer radial extremities of the breakers and directed towards the ring of teeth, the nozzles communicating with the hollow interior of the breakers, a duct passing through the casing for supplying water to the hollow breakers for discharge therefrom through said nozzles radially outwardly against the ring of teeth.

3. A comminuting apparatus comprising a casing, a ring of teeth carried within the casing, a rotor rotatably mounted within the ring of teeth, hollow, radially-extending breakers to co-act with the ring of teeth for comminuting material introduced to the casing, discharge nozzles in the outer radial extremities of the breakers and directed towards the ring of teeth, the nozzles communicating with the hollow interior of the breakers, the rotor having a hub with an open-ended axial water passage leading into the hollow breakers, a water-supply duct passing through the casing and terminating in an axial passage facing the open end of said axial hub passage and close thereto so that water from the supply duct is delivered to the hollow breakers for discharge therefrom through said nozzles radially outwardly against the ring of teeth.

References Cited in the file of this patent

UNITED STATES PATENTS

| | | |
|---|---|---|
| 1,207,069 | Park | Dec. 5, 1916 |
| 2,442,812 | Jordan | June 8, 1948 |
| 2,707,080 | Pezzilla | Apr. 26, 1955 |